I. B. KEMPSHALL.
ANTISKIDDING TIRE.
APPLICATION FILED JAN. 19, 1910.
957,165.
Patented May 3, 1910.
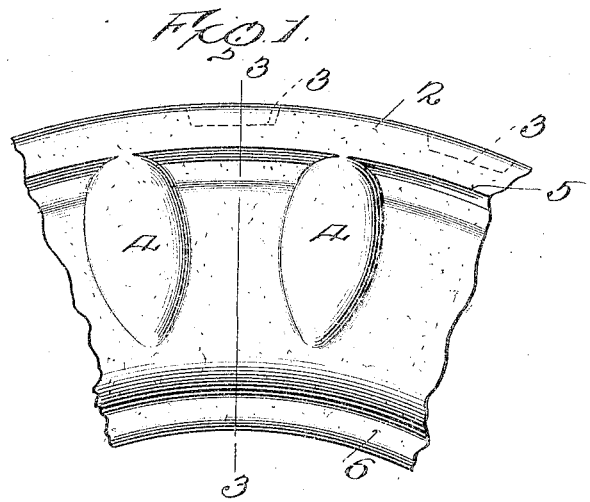
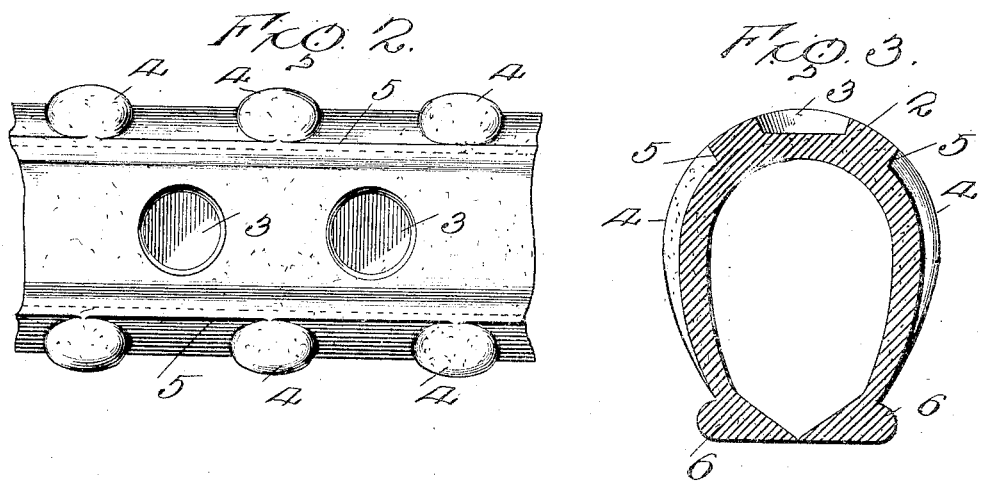
Witnesses
Inventor
Iva Belle Kempshall
By
Attorney

UNITED STATES PATENT OFFICE.

IVA BELLE KEMPSHALL, OF BOSTON, MASSACHUSETTS.

ANTISKIDDING-TIRE.

957,165.  Specification of Letters Patent.  Patented May 3, 1910.

Application filed January 19, 1910. Serial No. 538,853.

*To all whom it may concern:*

Be it known that I, IVA BELLE KEMPSHALL, a citizen of the United States, residing at Boston, in the county of Suffolk and State of Massachusetts, have invented certain new and useful Improvements in Antiskidding-Tires, of which the following is a specification.

This invention relates to an improvement in automobile tires, and more particularly to the wear portion or shoe thereof, the object of the invention being to provide an improved tire so constructed as to prevent skidding.

In the drawings accompanying and forming part of this specification, Figure 1 is a side elevation of a portion of this improved tire; Fig. 2 is a view of the tread portion thereof; Fig. 3 is a cross-sectional view taken in line 3—3 of Fig. 1.

Similar characters of reference indicate corresponding parts throughout the figures of the drawings.

In the form shown herein, the shoe when the tire is of pneumatic form, or the wear member thereof when of solid form, may be made of any preferred construction, the surface of which, however, is usually composed of rubber. In the present instance this wear member or shoe 2 is provided along its tread surface or periphery with a series of openings or recesses 3, preferably of circular formation, forming pockets. This series of pockets extends around the whole tread of the tire and forms suction chambers enabling the tire to effectively grip the road surface and prevent skidding. At each side of the tire, entirely around the same, and located intermediate such pockets, for the reasons hereinafter set forth, is a series of projections 4, shown in the present instance as of substantially oval form, that is, having curved outer and inner ends, with the outer ends of preferably larger curvature than the inner ends. The sides or side edges, however, may be in practice straighter than they are shown in the drawings without departing from the scope of the invention, each of these projections terminating or merging at its outer end in an off-set or projecting flange portion 5 of the tire tread, thus avoiding an abrupt or angular surface at the tread portion of the tire. These projections very materially reinforce the tire at the points of flexure thereof when the same is in use. These projections, being formed in the manner set forth, may have their greatest width at the point where the tire bends or flexes when under load, and furthermore, as they merge or terminate below or short of the tread surface of the tire they do not form buttresses the ends of which constitute a part of the tread itself, which in practice has proved to be objectionable where there are car tracks and slots in the road bed of traction systems which it is necessary to frequently cross.

Heretofore, where projections have been located at the side of the tire they terminate in an abrupt surface, the ends forming a portion of the tread, and these buttresses or projections not only tend to become mutilated, but to wrench the tire and wheel when crossing a car track or slots in the roadway of street railway lines. In the present improvement, however, the projections so merge at their outer ends in the tread surface of the tire that there are no abrupt surfaces to be mutilated or catch in tracks or slots of a road-bed.

The location of the projections between the openings or pockets in the manner shown is preferable and more desirable in practice than when the projections are located in alinement with the pockets, for the reason that when the projections are opposite the pockets the load upon the tire depresses the tread and thus brings the ends of the projections into a certain engagement with the road, such projections thus receiving to a large extent the load, with the result that the pockets or chambers are somewhat forced away from the road so that they do not adhere to the roadway as effectively as if the load came more directly upon the tread surface intermediate the pockets. By locating the projections, however, intermediate the pockets, or the pockets intermediate the projections, there is nothing to prevent the load from pressing the pocket portion of the tread directly in engagement with the road and thus effecting a greater suction adherence of the chambers or pockets with the road, while at the same time the reinforcement of the tire by means of the projections is still obtained and consequently, as hereinbefore stated, the more practicable and preferable construction is to have the projections located alternately with the openings.

In operation the load upon the tire depresses it, thus bringing into action one or another of the pockets and so prevents the skidding of the tire, while the flexure points of the tire when under load are reinforced by the projections, the tire shoe having the same cross-sectional area throughout, except where the projections are located, at which points the cross-sectional area of the shoe is materially increased and therefore the tire reinforced to prevent injury at the point of flexure when the tire is under load. These projections are also effective to prevent skidding, especially in turning corners.

The present improvement is adapted for use for all classes of resilient tires, whether solid, cushioned, or pneumatic or otherwise, and when the invention is applied to a shoe the shoe will be provided with the usual means for securing it in place, as a bead or flange 6 for attachment to the rim.

From the foregoing it will be observed that the outer ends of the projections on the tire merge short of the tread thereof in such way that the tread forms with the projections one continuous curve in cross section, (see Fig. 3), thus avoiding the formation of any abrupt surfaces at the termini of the projections adjacent to the tread.

As hereinbefore stated, the projections terminate or merge in the offset portion of the tire and short of the tread, and in practice they may terminate more nearly at the base of the offset.

I claim as my invention:

1. An anti-skidding tire for motor driven vehicles, having the tread surface provided with a series of pockets and having at each side of the tread surface a series of projections each terminating at its outer end adjacent to the tread surface, the projections being located alternately with the openings and wholly therebetween so as to be entirely out of line therewith, whereby the engagement of such projections with the roadway will not raise the pockets from the roadway to interfere with the effective suction action thereof.

2. An anti-skidding tire for motor driven vehicles, having the tread surface provided with a series of pockets and having at each side of the tread surface a series of projections each merging at its outer end in the tire short of the tread surface, and each pocket being located between a pair of projections at each side of the tire and entirely out of alinement with such projections, whereby the engagement of such projections with the roadway will not raise the pockets from the roadway to interfere with the effective suction action thereof.

3. An anti-skidding tire for motor driven vehicles, having a tread portion provided with a series of pockets, the tread portion having each side thereof off-set from the side of the tire, and a series of projections located at each side of the tire with their outer ends terminating adjacent to the offset of the tread, said projections being located alternately with the pockets and wholly therebetween so as to be entirely out of line with the openings, whereby the engagement of such projections with the roadway will not raise the pockets from the roadway to interfere with the effective suction action thereof.

4. An anti-skidding tire for motor driven vehicles, having a tread portion provided with a series of chambers or pockets, the tread portion having each side thereof off-set from the side of the tire, and a series of projections located at each side of the tire with their outer ends terminating at the off-set of the tread.

5. An anti-skidding tire for motor driven vehicles, having a tread portion provided with a series of chambers or pockets, the tread portion having each side thereof off-set from the side of the tire, and a series of oval formed projections located at each side of the tire with their outer ends terminating at the off-set of the tread.

6. An anti-skidding tire for motor driven vehicles, having a tread surface provided with a series of circular pockets or chambers, said tread surface having at each side an off-set from the side of the tire, and a series of projections at each side of the tire of oval form, the outer ends merging into the off-set of the tread and terminating short of such tread and their inner ends merging into the side surfaces of the tire, said projections having their greatest area at substantially the point of flexure of the tire when under load, and of a length to extend nearly the full height of the side walls of the tire.

7. An anti-skidding tire for motor driven vehicles having a tread portion, the tread portion having each side thereof off-set from the side of the tire, and a series of projections located at each side of the tire with their outer ends terminating at the off-set of the tread.

8. An anti-skidding tire for motor driven vehicles having a tread portion, the tread portion having each side thereof off-set from the side of the tire, the off-set portions inclining toward the central portion of the tire to present oppositely inclined annular faces, a plurality of projections extending from each of the oppositely disposed faces toward the inner edge of the tire to receive the end thrust of the incline faces when load pressure is applied.

9. An anti-skidding tire for motor driven vehicles, having a tread portion convex in cross section, the tread portion having each side thereof off-set from the side of the tire, said off-set portions being wholly within the plane of the outermost surface of the convex tread, and a series of projections located at each side of the tire with their outer ends terminating at the off-set of the tread.

IVA BELLE KEMPSHALL.

Witnesses:
C. P. WEED,
F. E. BOYCE.